United States Patent Office

3,413,262
Patented Nov. 26, 1968

3,413,262
STABILIZATION OF POLYPROPYLENE
AGAINST DEGRADATIVE DETERIO-
RATION ON LONG-TERM EXPOSURE
TO ELEVATED TEMPERATURES
Arthur C. Hecker, Forest Hills, N.Y., and Aaron Rosenbaum, Millburn, and Norman L. Perry, Wayne, N.J., assignors to Argus Chemical Corporation, New York, N.Y., a corporation of New York
No Drawing. Continuation of application Ser. No. 111,449, May 22, 1961. This application Apr. 8, 1965, Ser. No. 446,725
13 Claims. (Cl. 260—45.75)

---

ABSTRACT OF THE DISCLOSURE

Stabilizer combinations are provided for use in improving the resistance of polypropylene to deterioration in physical properties upon exposure to temperatures as high as 525° F. and above. The stabilizer combinations contain oxalic acid and thiodipropionic acid esters and/or polyvalent metal salts of organic acids and optionally, phenols and/or organic phosphites.

Polypropylene compositions having improved resistance to deterioration upon exposure to temperatures as high as 525° F. and above are also provided. Such polypropylene compositions contain oxalic acid, and optionally phenols and/or thiodipropionic acid esters and/or polyvalent metal salts of organic acids and/or organic phosphites.

---

This application is a continuation of U.S. application Ser. No. 111,449, filed May 22, 1961, now abandoned.

This invention relates to stabilizer combinations comprising oxalic acid useful in the stabilization of polypropylene against degradative deterioration in physical properties as a result of long-term exposure to elevated temperatures of at least 525° F., and above, and to polypropylene compositions having increased stability against deterioration in physical properties over long periods of time due to the presence of such stabilizer or stabilizers, and to a process of stabilizing polypropylene, employing such stabilizer or stabilizers.

Polypropylene is a tough, high-melting polymeric material, but in several respects its stability leaves much to be desired. The polymer shows a tendency to decrease rapidly in melt viscosity and then to become brittle when kept at elevated temperatures for the time required in milling, calendering, extrusion, injection molding and fiber-forming equipment. This deterioration is particularly serious when the polymer is worked in the molten state in the presence of oxygen, e.g. air. Shaped polymers prepared in such equipment show a tendency to discolor, to become distorted, to crack, and to powder around the edges upon exposure to sunlight and during ageing, and especially when heated at moderately elevated temperatures as in an accelerated ageing process, and again, the problem is accentuated in the presence of oxygen.

One of the most serious stabilization problems is the poor resistance of the polymer to high temperatures, of the order of 400° F. to 525° F. and above. It is now possible using one or more stabilizers to obtain a reasonably good stability against deterioration under most processing conditions, except such high temperatures. Some stabilizers which are satisfactory in particular areas actually diminish high temperature stability, and some which alone increase high temperature resistance become ineffective in the presence of stabilizers added to correct other deteriorative tendencies.

To meet commercial requirements, it is, of course, quite important that the polymer retain its physical properties during all temperature conditions that may be encountered during processing and thereafter. However, the art has experienced great difficulty in achieving the necessary heat stabilization. The changes leading to heat deterioration in physical properties probably arise from chemical modification of the polymer, but the mechanism is not yet known. Lack of knowledge of the basis naturally had hindered the development of satisfactory heat stabilizers.

Polypropylenes tend to differ in their deteriorative tendencies according to the process by which they are prepared. Apparently, molecular weight and stereoregularity (tacticity) are factors. This complicates the development of a stabilizer which will make polypropylene sufficiently stable to be an additional advantage if such a stabilizer could be incorporated either by the converter or by the manufacturer, without affecting or being itself affected disadvantageously by other stabilizer systems required to counteract other deteriorative effects.

In accordance with the instant invention, a heat stabilizer is provided, comprising oxalic acid which, whether in combination with other polypropylene stabilizers or alone, improves the resistance of polypropylene to deterioration, as evidenced by change in melt index, at elevated temperatures of at least 525° F. and above for long periods of time.

Purity of propylene polymers, extent of degradation, and resistance to embrittlement at elevated temperatures over long periods of time are characteristics capable of evaluation by observation of the change in the melt index of the particular polymer when subjected to specified temperatures for a specified time. There is a direct correlation between the rate of increase in melt index and the rate of deterioration in the above-mentioned physical qualities of the polymer. Oxalic acid significantly reduces the rate of increase in melt index at elevated temperatures, and may also improve retention of other important physical properties of the polypropylene at elevated temperatures.

Oxalic acid has a low vapor pressure at polypropylene working temperatures, i.e., at approximately 350° F., so that it will not be lost from the mix during hot-working. It is also compatible with the resin at all temperatures to which the composition is to be subjected.

The oxalic acid can also be used in conjunction with other polypropylene stabilizers, without disadvantageous effect upon the stabilizing action of the other stabilizers. In such combinations, the oxalic acid increases resistance to deterioration at temperatures above 525° F., and the other stabilizers increase resistance to deterioration at temperatures below 525° F. In many cases an enhanced activity is observed in such combinations. Such additional stabilizers include for instance phenols, organic phosphites, thiodipropionic acid esters, polyvalent metal salts of organic acids, organic mercaptans and organic polysulfides.

When the oxalic acid stabilizer is used in conjunction with a phenol the phenol contains one or more phenolic hydroxyl groups, and may contain one or more phenolic nuclei. In addition, the phenolic nucleus may contain an oxy or thio ether group.

The alkyl-substituted phenols and polynuclear phenols because of their molecular weight have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in any alkyl, alicyclene and alkylene groups, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one, or in the same or different rings, if there are more than one. In the case of bicyclic phenols, the rings can be linked by thio or oxyether groups, or by alkylene, alicyclene or arylene groups. Such phenols, which are preferred because of their superior stabilizing action, can be defined by the formula:

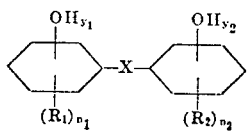

where X is an oxygen or sulfur atom, or an alkylene or alicyclene or arylene or a mixed alkylene-alicyclene or alkylene-arylene group, having a straight or branched chain, whose total number of carbon atoms ranges from one to about eighteen, $y_1$ and $y_2$ are the number of phenolic hydroxyl groups OH, $n_1$ and $n_2$ are the number of R groups, and $R_1$ and $R_2$ are hydrogen or alkyl of one to about eighteen carbon atoms. Preferably, the OH groups are ortho and/or para to X.

The sum of $y$ and $n$ in each ring cannot, of course, exceed five.

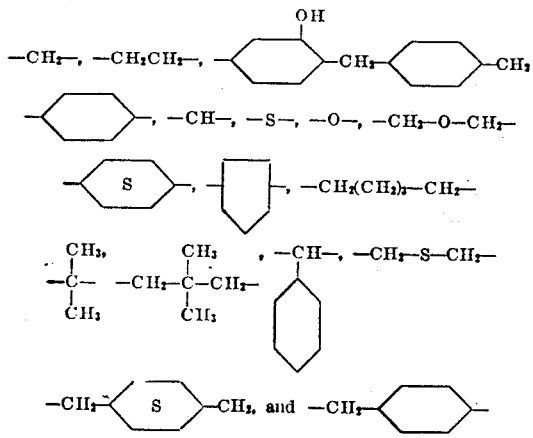

The various X and R groups are exemplified in the following compounds.

Exemplary of satisfactory monohydric phenols are 2,6-di-tertiary-butyl-4-methyl phenol, 2-tertiary-butyl-4-methoxy phenol, nonyl phenol, dodecyl phenol, dinonyl phenol, phenyl phenol, tetradecyl phenol, and tetrahydro-α-naphthol.

Exemplary polyhydric phenols are orcinol, propyl gallate, catechol, resorcinol, p-octyl resorcinol, p-dodecyl resorcinol, p-octadecyl catechol, p-isooctyl-phloroglucinol, pyrogallol, hexahydroxy benzene, p-isohexyl-catechol,
2,6-ditertiary butyl resorcinol,
2,6-diisopropyl phloroglucinol,
methylenebis(2,6-ditertiary butyl-m-cresol),
methylenebis(2,6-ditertiary butyl phenol),
2,2-bis(4-hydroxy phenyl)propane,
methylenebis(p-cresol),
4,4′-thio-bisphenol,
4,4′-oxobis(3-methyl-6-isopropyl phenol),
4,4′-thiobis(3-methyl-6-tertiary butyl phenol),
2,2′-oxobis(4-dodecyl phenol),
2,2′-thiobis(4-methyl-6-tertiary butyl phenol),
2,6-diisooctyl resorcinol,
4,4′-n-butylidenebis(2-tertiary-butyl-5-methyl-phenol),
4,4′-benzylidenebis(2-tertiary-butyl-5-methyl phenol),
2,2′-methylenebis(4-methyl-6-(1′-methyl-cyclohexyl)-phenol),
4,4′-cyclohexylidenebis(2-tertiary-butylphenol),
2,6-bis(2′-hydroxy-3′-tertiary-butyl-5′-methylbenzyl)-4-methylphenol,
4-octyl pyrogallol, and
3,5-ditertiary butyl catechol.

When the oxalic acid stabilizer is used in conjunction with an organic phosphite the organic phosphite can be any organic phosphite having the formula $(RA)_3P$ in which A can be oxygen or sulfur or a mixture of the same, and R can be selected from the group consisting of aryl, alkyl, cycloalkyl, aralkyl and alkaryl groups, in any combinations. The term "organic phosphite triester" as used herein is inclusive of oxo, thio and mixed oxo thio phosphites. Usually, the phosphite will not have more than about sixty carbon atoms.

Exemplary are monophenyl di-2-ethyl hexyl phosphite, diphenyl mono-2-ethyl hexyl phosphite, di-isooctyl monotolyl phosphite, tri-2-ethyl hexyl phosphite, phenyl dicyclohexyl phosphite, phenyldiethyl phosphite, triphenyl phosphite, tricresyl phosphite, tri(dimethylphenyl) phosphite, trioctadecyl phosphite, triisooctyl phosphite, tridodecyl phosphite, isooctyl diphenyl phosphite, diisooctyl phenyl phosphite, tri(t-octylphenyl) phosphite, tri(t-nonylphenyl) phosphite, benzyl methyl isopropyl phosphite, butyl dicresyl phosphite, isooctyl di(octylphenyl) phosphite, di(2-ethylhexyl) (isooctylphenyl) phosphite, tri-(2-cyclohexylphenyl) phosphite, tri-α-naphthyl phosphite, tri(phenylphenyl) phosphite, tri(2-phenyl ethyl) phosphite, tridodecyl thiophosphite, tri-p-tert-butyl phenyl thiophosphite, dodecyl thiodiphenyl phosphite and tert-butyl phenyl thio-di-2-ethylhexyl phosphite.

When the oxalic acid stabilizer is used in conjunction with a thiodipropionic acid ester the thiodipropionic acid acid ester has the following formula:

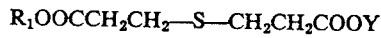

in which R is an organic radical selected from the group consisting of hydrocarbon radicals such as alkyl, alkenyl, aryl, cycloalkyl; mixed alkyl aryl, and mixed alkyl cycloalkyl radicals; hydroxyalkyl and hydroxyoxyalkylene radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of n thiodipropionic acid ester units:

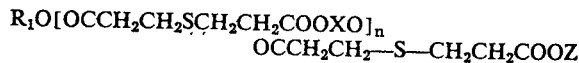

where Z is hydrogen, $R_2$ or M; $n$ is the number of thiodipropionic acid ester units in the chain; and X is a bivalent hydrocarbon group of the type of $R_1$; the value of $n$ can range upwards from 1, but there is no upper limit on $n$ except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule the thiodipropionic ester has a total of from about ten to about sixty carbon atoms per sulfur atom.

Accordingly, the various thiodipropionic acid ester species coming within the above-designated categories within the general formula can be defined as follows:

(a) $R_1OOCCH_2CH_2SCH_2CH_2COOH$ (b) $R_1OOCCH_2CH_2SCH_2CH_2COOR_2$ (c) $R_1O[OCCH_2CH_2SCH_2CH_2COOX-O]_n$
   $OCCH_2CH_2SCH_2-CH_2COOZ$ (d) $R_1OOCCH_2CH_2SCH_2CH_2COOM$

In the above formulae $R_1$ and $R_2$, M, X and Z are the same as before. In the polymer (c), as in the other forms of thiodipropionic acid esters, the total number of carbon atoms per sulfur atom is within the range from about ten to about sixty.

The R radical of these esters is important in furnishing compatibility with the polypropylene. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1,2-propylene,

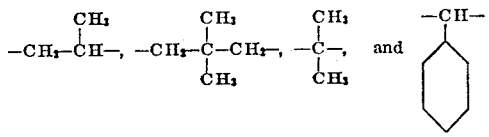

arylene radicals such as phenylene

methylenephenylene

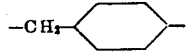

dimethylene phenylene,

and alicyclylene radicals such as cyclohexylene

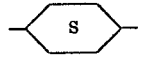

and cyclopentylene

As exemplary of the thiodipropionic acid esters which can be used, there can be mentioned the following: monolauryl thiodipropionic acid, dilauryl thiodipropionate, butyl stearyl thiodipropionate, 2-ethylhexyl lauryl thiodipropionate, di - 2 - ethylhexyl - thiodipropionate, di-isodecylthiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl) thiodipropionic acid.

These esters are for the most part known compounds, but where they are not available, they are readily prepared by esterification of thiodipropionic acid and the corresponding alcohol.

When the oxalic acid stabilizer is used in conjunction with a polyvalent metal salt of an organic acid the polyvalent metal salt of an organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogeneous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl zenzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

The preferred stabilizer system of the invention comprises four stabilizers, oxalic acid, an organic polyhydric phenol, an organic phosphite, and a thiodipropionic acid ester. An additional fifth ingredient which is included in the preferred systems of the invention, but which is not essential, is a polyvalent metal salt of an organic acid. These four and five stabilizers together given an enhanced stabilization which is not obtainable from any of them alone or in combinations of two or three. When taken alone, the components of this stabilizer system are capable only of inhibiting deterioration in one or two respects, and quite large amounts may be needed before any effect is noted. In such combinations, the oxalic acid increases resistance to deterioration at temperatures above 525° F., and the other stabilizers increase resistance to deterioration at temperatures below 525° F. In many cases an enhanced activity is observed in such combinations.

The components other than oxalic acid in pairs may display a lesser stabilizing effect than any one alone. For example, the phenol alone gives an improved resistance to embrittlement and reduction in melt viscosity at elevated temperatures, but little assistance as to maintenance of color. The phosphite alone is a rather poor stabilizer in preventing deterioration in the first two properties, but it does assist in resisting discoloration. The two together are worse than the phenol alone in every respect except color, which is intermediate.

The thiodipropionic acid ester by itself only improves resistance to embrittlement. The polyvalent salt of an organic acid by itself only prevents discoloration. In combinations with the phenol, the color is worse than with the salt alone, and in combinations with phosphite only discoloration is prevented.

In view of this, it is surprising that oxalic acid, phenol, phosphite and thiodipropionic acid ester taken together in the same total amount not only prevent discoloration but also embrittlement and inhibit the increase in melt index at processing temperatures with accompanying degradation of physical properties, and furthermore greatly enhance the resistance to discoloration and embrittlement on ageing to far beyond that obtainable from the components individually. This enhanced stabilizing activity is obtained with any polypropylene, regardless of the process by which it is prepared.

A sufficient amount of the stabilizer, i.e., the oxalic acid, with or without additional stabilizers, is used to improve the stability against deterioration in physical properties, including, for example, reduction in melt viscosity and embrittlement, under the conditions to which the polypropylene will be subjected. Very small amounts are usually adequate. Amounts within the range from about 0.005 to about 5% of oxalic acid by weight of the polypropylene impart satisfactory heat resistance. Preferably, from 0.1 to 2.5% is employed for optimum heat stabilization. If additional stabilizers are employed to obtain additional stabilization effects, the amount of total stabilizer is within the range from about 0.005 to about 5%, preferably from 0.1 to 2.5%.

Preferably, the stabilizer system comprises polypropylene, from about 0.001 to about 0.25% of oxalic acid, from about 0.025 to about 0.5% of a phenol, from about 0.05 to about 1.25% of a phosphite, and from about 0.05 to about 1% of a thiodipropionic acid ester, with from about 0.025 to about 0.75% of a polyvalent metal salt, when present.

The stabilizer of the instant invention, when taken with other stabilizers, is comprised of from about 0.01 to about 2.5 parts by weight of oxalic acid and from about 0.1 to about 35 parts by weight of at least one other polyproylene stabilizer.

Preferably, the stabilizer combination comprises from about 0.01 to about 2.5 parts by weight of oxalic acid, from about 0.1 to about 5 parts by weight of the phenol, from about 0.2 to about 12.5 parts by weight of the organic phosphite, and from about 0.2 to about 10 parts by weight of the thiodipropionate, with from about 0.1 to about 7.5 parts by weight of the polyvalent metal salt, when present.

If a combination of stabilizers is to be utilized, they may be formulated as a simple mixture for incorporation in the polymer by the polymer manufacturer or by the converter. An invert organic solvent can be used to facilitate handling, if the ingredients do not form a homogeneous mixture or solution.

Polypropylene solid polymer can be defined in a manner to differentiate it from other polyolefins as having a density within the range of from 0.86 to 0.91, and a melting point above 150° C. The stabilizer of the invention is applicable to all such polypropylenes, as distinguished from polypropylenes in the liquid form or in semiliquid or gel-like forms, such as are used as greases and waxes.

The stabilizer of the invention is applicable to polypropylenes prepared by any of the various procedures, for the molecular weight and tacticity are not factors affecting this stabilizer. Isotactic polypropylene, available commercially under the trade names Pro-Fax, Escon and Olefane and having a softening or hot-working temperature of about 350° F., is an example of a sterically regular polypropylene polymer.

Mixtures of polypropylene with other compatible polymers and copolymers of propylene with copolymerizable monomers not reactive with oxalic acid also can be stabilized in accordance with this invention. For example, mixtures of polyethylene and polypropylene, and copolymers of propylene and ethylene which contain a sufficient amount of propylene to present the instability problem that is resolved by the stabilizer of the invention, may be stabilized by the addition of oxalic acid, alone or in combination with other polypropylene stabilizers.

The stabilizers of the invention may also be used with polyolefins higher than polypropylene, such as polybutylene and polyisobutylene.

The stabilizer is incorporated in the polymer in suitable mixing equipment, such as a mill or a Banbury mixer. If the polypropylene has a melt viscosity which is too high for the desired use, the polypropylene can be worked until its melt viscosity has been reduced to the desired range before addition of the stabilizer. However, polypropylenes in a range of workable melt viscosities are now available. Mixing is continued until the mixture is substantially uniform. The resulting composition is then removed from the mixing equipment and brought to the size and shape desired for marketing or use.

The stabilized polypropylene can be worked into the desired shape, such as by milling, calendering, extrusion or injection molding or fiber-forming. In such operations, it will be found to have a considerably improved resistance to reduction in melt viscosity during the heating, as well as a better resistance to discoloration and embrittlement on ageing and heating.

The heat stabilizing effect of the oxalic acid of the invention was evaluated in the working examples which follow using a modified ASTM D1238–57T test procedure for determining melt index, using a 2160 g. weight load on the plastometer piston. $M_0$ is the initial melt index of the polymer obtained. $M_I$ is the melt index after molding at 375° F. for three minutes. $M_{600°\ F.}$ is the melt index after heating the polymer in a mold at 600° F. for 30 minutes. The 600° F. temperature was selected from in the range above 525° F. as an extreme, resistance to which for the test period ensured stability at 525° F. for a considerably extended period. The ratio or the change in melt index for this period, $M_{600°\ F.}/M_I$, is an accurate measure of the degree of heat stabilization imparted by the stabilizer added, irrespective of the numerical value of the initial melt indices of the different samples of one particular polymer. The lower the ratio the less the change, and the greater the stabilizing effect.

Example 1

Polypropylene stabilized with oxalic acid was compared with unstabilized polypropylene. A total of 0.1% stabilizer was used. The oxalic acid was weighed and dispersed by hand stirring in powdered previously unstabilized polypropylene. (Polymer I) This polymer as supplied had a melt index of 2.5 ($M_0$) ASTM D1238–57T at 230° C. The mixture was placed on a 2-roll mill and fluxed for five minutes at 170±2° C. The melt index $M_I$ of pieces cut from the milled sheet was obtained, and the $M_{600°\ F.}$ was also obtained, in the above described manner.

For comparison purposes, a control was milled and fluxed in exactly the same manner, and tested for heat stability. Due to the fluxing without a stabilizer, the initial melt index was lower than that of the starting polymer.

TABLE I

| Sample No.: | Parts | |
|---|---|---|
| | A | B |
| Polypropylene (Polymer I) | 100 | 100 |
| Oxalic acid | | 0.1 |
| $M_0$ | 2.5 | 2.5 |
| $M_I$ | 22.7 | 35.1 |
| $M_{600°F.}$ | 111.4 | 66.2 |
| $M_{600°F.}/M_I$ | 4.9 | 1.9 |

NOTE.—$M_0$=Initial Melt Index; $M_I$=Melt Index after heating 3 min. at 375° F.; $M_{600°F.}$=Melt Index after 30 min. at 600° F.; $M_{600°F.}/M_I$=Melt Index Ratio.

The data of Table I clearly indicate that the stabilizer of this invention has little effect at 375° F., but greatly improved the resistance of the polypropylene to prolonged exposure at temperatures above 525° F., i.e., at 600° F. The added 0.1% of oxalic acid by weight of polymer was sufficient to limit the increase in melt index ratio due to degradative deterioration on long-term exposure at 600° F. to 1.9, as compared to 4.9 for an unstabilized polypropylene under the same conditions. Both the $M_{600°F.}$ and the final melt index ratio was appreciably lower for the sample to which oxalic acid had been added as a stabilizer, showing the increase in heat stability at 600° F. due to the oxalic acid.

Example 2

Polypropylene alone and previously stabilized by ditertiary butyl p-cresol was further improved by the addition of oxalic acid. The stabilizers named in Table II were weighed and dispersed by hand stirring in 100 parts of powdered previously unstabilized polypropylene (Polymer II). This polymer as supplied had a melt index of 1.0, ASTM D1238–57T at 230° C. In some cases 0.25 part of ditertiary butyl p-cresol was used; an additional 0.1 part of oxalic acid was added in two cases as indicated in Table II. The mixture was in each case placed on a 2-roll mill and fluxed for five minutes at 170±2° C. Pieces cut from the milled sheet were used in the tests.

TABLE II

| Sample No. | Parts | | | |
|---|---|---|---|---|
| | C | D | E | F |
| Polypropylene (Polymer II) | 100 | 100 | 100 | 100 |
| Ditertiarybutyl p-cresol | | | 0.25 | 0.25 |
| Oxalic acid | | 0.1 | | 0.1 |
| $M_0$ | 1.0 | 1.0 | 1.0 | 1.0 |
| $M_I$ | 8.9 | 8.8 | 1.06 | 1.24 |
| $M_{600°F.}$ | 63.1 | 56.1 | 8.00 | 3.27 |
| $M_{600°F.}/M_I$ | 7.1 | 6.4 | 7.55 | 2.64 |

These data clearly indicate that the oxalic acid increased the resistance of the polymer to degradative deterioration on prolonged exposure to temperatures of the order of 525° F. and above, i.e. 600° F. The phenol holds melt index at low temperatures, as evidenced by the lower $M_I$. The addition of oxalic acid to the polymer containing a phenol decreased the rate of deterioration at over 525° F., as evidenced by the melt index ratio. Oxalic acid is thus valuable in combination with some stabilizers which, although valuable in preserving some other physical property of a polymer, diminish its high temperature stability.

Example 3

A series of stabilized polypropylene compositions were prepared, using various quantities and combinations of stabilizers in accordance with the invention. A blend of phosphite and phenol was prepared before incorporation with metal salt, the thiodipropionic acid ester, and the resin, to prevent separation of the bisphenol. The concentrates of phenol and phosphite were blended with zinc 2-ethylhexoate and lauryl thiodipropionate. Equal portions of the above described stabilizing mixture were weighed and dispersed by hand stirring in powdered previously unstabilized polypropylene (Polymer I). The so stabilized polypropylene was compared with similarly stabilized polypropylene to which oxalic acid had been added as an additional stabilizer, the polymer alone, and the polymer stabilized with oxalic acid.

TABLE III

| Sample No. | Parts | | | | |
|---|---|---|---|---|---|
| | G | H | I | J | K |
| Polypropylene (Polymer I) | 100 | 100 | 100 | 100 | 100 |
| Isooctyl diphenyl phosphite | | | 0.14 | 0.14 | 0.14 |
| Zinc 2-ethylhexoate | | | 0.06 | 0.06 | 0.06 |
| 4,4'-butylidene-bis(3-methyl-6-tert-butyl phenol) | | | 0.05 | 0.05 | 0.05 |
| Lauryl thiodipropionate | | | 0.25 | 0.25 | 0.25 |
| Oxalic acid | | 0.1 | | 0.05 | 0.1 |
| $M_0$ | 2.5 | 2.5 | 2.5 | 2.5 | 2.5 |
| $M_I$ | 22.7 | 35.6 | 3.0 | 3.0 | 3.0 |
| $M_{600°F.}$ | 111.4 | 66.2 | 30.3 | 20.4 | 15.6 |
| $M_{600°F.}/M_I$ | 4.9 | 1.9 | 10.1 | 6.8 | 5.2 |

A comparison of the $M_{600°F.}/M_I$ ratios obtained from these tests indicate, as above tabulated, that oxalic acid appreciably increased the thermal stability of the polypropylene at 600° F., both alone and in conjunction with other stabilizers. Therefore, the stabilizing compositions of this invention may effectively be used both to increase the resistance of prestabilized polypropylene to degradative deterioration on long term exposure to high temperatures during hot working, calendering, molding, etc., and to stabilize the polymer alone.

Example 4

A series of stabilized polypropylene compositions, using various quantities and combinations of stabilizers, in accordance with the invention and in the proportions indicated in the table below, were prepared in accordance with the method described in Example 3. The effect on the heat stabilization of the polymer by the addition of lauryl thiodipropionate and/or oxalic acid was noted.

TABLE IV

| Sample No. | Parts | | | |
|---|---|---|---|---|
| | L | M | N | O |
| Polypropylene (Polymer I) | 100 | 100 | 100 | 100 |
| Isooctyl diphenyl phosphite | 0.14 | 0.14 | 0.14 | 0.14 |
| Zinc 2-ethylhexoate | 0.06 | 0.06 | 0.06 | 0.06 |
| 4,4'-thiobis(2-tert-butyl-5-methyl phenol) | 0.05 | 0.05 | | 0.05 |
| Lauryl thiodipropionate | | | 0.05 | 0.05 |
| Oxalic acid | | 0.1 | | 0.1 |

In each of the above samples the greater heat stability, as evidenced by the lowest melt index ratio, was achieved with oxalic acid as a stabilizer. Thus, oxalic acid is effectively used to restore resistance to degradative deterioration where that resistance has been reduced by the addition of a compound which preserves other physical properties of the polymer, but decreases its heat stability.

Example 5

A series of polypropylene stabilizing combinations was prepared in accordance with Example 3 using the proportions of Table V below. Oxalic acid was used as the additional stabilizer. The portions of stabilizers were weighed and dispersed by hand stirring in powdered previously unstabilized polypropylene (Polymer III). This polymer as supplied had a melt index of 2.8. ASTMD 1238-57T at 230° C. The mixture was placed on a 2-roll mill and fluxed for five minutes at 170±2° C. Pieces cut from the milled sheet were used in the tests.

TABLE V

| Sample No. | Parts | | | |
|---|---|---|---|---|
| | P | Q | R | S |
| Polypropylene (Polymer III) | 100 | 100 | 100 | 100 |
| Isooctyl diphenyl phosphite | 0.14 | 0.14 | 0.14 | 0.14 |
| Zinc 2-ethylhexoate | 0.06 | 0.06 | 0.06 | 0.06 |
| 4,4'-thiobis(2-tert-butyl-5-methylphenol) | 0.05 | 0.05 | | |
| 4,4'-butylidene-bis(3-methyl-6-tert-butyl phenol) | | | 0.05 | 0.05 |
| Lauryl thiodipropionate | 0.25 | 0.25 | 0.25 | 0.25 |
| Oxalic acid | | 0.1 | | 0.1 |

In the two instances where oxalic acid was added as an additional stabilizer the resistance of the polymer to degradative deterioration was increased appreciably, indicating an increased thermal stability of the polymers stabilized with oxalic acid.

Example 6

Polypropylene stabilized with a combination of transesterified octyl diphenyl phosphite and 4,4'-thiobis(2-tert-butyl-5-methylphenol) with lauryl thiodipropionate was compared with a polymer so prestabilized containing oxalic acid as an additional stabilizer.

A blend of phosphite and phenol was prepared before incorporation with the polypropylene to prevent separation of the phenol. 4,4'-thiobis(2-tertiary-butyl-5-methylphenol) (100 g.), isooctyl diphenyl phosphite (150 g.), and calcium hydroxide (0.5 g.), were stirred and heated at 120 to 125° C. for three hours. At the end of this time, a clear brown solution had formed, and this solution remained homogeneous at room temperature. When the reaction mixture was heated at 125 to 135° C. under reduced pressure, phenol was distilled off, showing that transesterification had occurred.

The stabilizers were weighed and dispersed by hand stirring in powdered polypropylene (Polymer I) in the proportions indicated in the following table. The resulting mixtures were each placed on a 2-roll mill and fluxed for five minutes at 170±2° C. Pieces cut from the milled sheet were tested as in the previous examples.

TABLE VI

| Sample No. | Parts | |
|---|---|---|
| | T | U |
| Polypropylene (Polymer I) | 100 | 100 |
| Transesterified mixture of isooctyl diphenyl phosphite and 4,4'-thiobis(2-tert-butyl-5-methylphenol) | 0.31 | 0.31 |
| Lauryl thiodipropionate | 0.25 | 0.25 |
| Oxalic acid | | 0.10 |

A comparison of the $M_{600°\,F.}/M_I$ ratios indicated that the addition of oxalic acid to the prestabilized polymer appreciably reduced the degradative decomposition of the polypropylene due to prolonged exposure to heat.

Example 7

Commercially available prestabilized polypropylenes, Profax 6511 and 6512, were compared with such polymers to which oxalic acid had been added in accordance with this invention in the proportions indicated in the table below:

TABLE VII

| Sample No. | Parts | | | |
|---|---|---|---|---|
| | V | W | X | Y |
| Commercial Prestabilized Polypropylene (Profax 6511) | 100 | 100 | | |
| Commercial Prestabilized Polypropylene (Profax 6512) | | | 100 | 100 |
| Oxalic acid | | 0.1 | | 0.1 |

A comparison of the final melt index ratios indicated that the addition of oxalic acid to commercially available prestabilized polypropylene markedly improved its thermal stability as evidenced by its resistance to degradative deterioration upon prolonged exposure to elevated temperatures.

We claim:

1. A stabilizer combination for use in improving the resistance of polypropylene to deterioration in physical properties on exposure to temperatures as high as 525° F. and above, consisting essentially of oxalic acid in an amount of from about 0.01 to about 2.5 parts by weight and at least one other polypropylene stabilizer selected from the group consisting of thiodipropionic acid esters and Group II metal salts of organic non-nitrogenous monocarboxylic acids having from about six to about twenty-four carbon atoms, in an amount of from about 0.1 to about 35 parts by weight, the stabilizers being compatible with polypropylene and having a low vapor pressure at polypropylene working temperatures.

2. A stabilizer combination in accordance with claim 1, including in addition from about 0.1 to about 5 parts by weight of a phenol.

3. A stabilizer combination in accordance with claim 1, including in addition from about 0.1 to about 5 parts by weight of a bicyclic phenol.

4. A stabilizer combination in accordance with claim 1, including in addition from about 0.2 to about 12.5 parts by weight of an organic phosphite triester.

5. A stabilizer combination in accordance with claim 1 consisting essentially of oxalic acid and from about 0.1 to about 7.5 parts by weight of a Group II metal salt to an organic acid.

6. A stabilizer combination in accordance with claim 1 consisting essentially of oxalic acid and from about 0.2 to about 10 parts by weight of a thiodipropionate.

7. A stabilizer combination in accordance with claim 1 consisting essentially of oxalic acid and from about 0.1 to about 5 parts by weight of a phenol, from about 0.2 to about 12.5 parts by weight of an organic phosphite triester, and from about 0.2 to about 10 parts by weight of a thiodipropionate.

8. A stabilizer combination in accordance with claim 1 consisting essentially of oxalic acid and from about 0.1 to about 5 parts by weight of a phenol, from about 0.2 to about 12.5 parts by weight of an organic phosphite triester, from about 0.2 to about 10 parts by weight of a thiodipropionate, and from about 0.1 to about 7.5 parts by weight of a Group II metal salt of an organic acid.

9. A polypropylene composition having improved resistance to deterioration upon exposure to temperatures as high as 525° F. and above comprising polypropylene and from about 0.005 to about 5% by weight of oxalic acid.

10. A polypropylene composition in accordance with claim 9, in which the polypropylene is an isotactic polypropylene.

11. A polypropylene composition having improved resistance to deterioration upon exposure to temperatures as high as 525° F. and above, comprising polypropylene, oxalic acid and at least one other polypropylene stabilizer selected from the group consisting of phenols, organic phosphite triesters, thiodipropionic acid esters and Group II metal salts of organic non-nitrogenous monocarboxylic acids having from six to tweny-four carbon atoms, in a total amount of from about 0.005 to about 5% by weight.

12. A polypropylene composition in accordance with claim 11, comprising polypropylene, from about 0.001 to about 0.25% of oxalic acid, from about 0.025 to about 0.5% of a phenol, from about 0.05 to about 1.25% of an organic phosphite triester, and from about 0.05 to about 1% of thiodipropionic acid ester.

13. A polypropylene composition in accordance with claim 12 comprising, in addition, from 0.025 to about 0.75% of a Group II metal salt of an organic acid.

References Cited

UNITED STATES PATENTS

| | | | |
|---|---|---|---|
| 2,327,517 | 6/1943 | Frolich | 260—94.9 |
| 2,829,120 | 4/1958 | Parker | 260—45.75 |
| 2,985,617 | 5/1961 | Salyer | 260—45.7 |
| 3,027,351 | 3/1962 | Lichty | 260—45.85 |

FOREIGN PATENTS 851,670  10/1960  Great Britain.

DONALD E. CZAJA, *Primary Examiner.*

V. P. HOKE *Assistant Examiner.*

UNITED STATES PATENT OFFICE
CERTIFICATE OF CORRECTION

Patent No. 3,413,262                           November 26, 1968

Arthur C. Hecker et al.

It is certified that error appears in the above identified patent and that said Letters Patent are hereby corrected as shown below:

Column 3, lines 33 to 36, the formulas should appear as shown below:

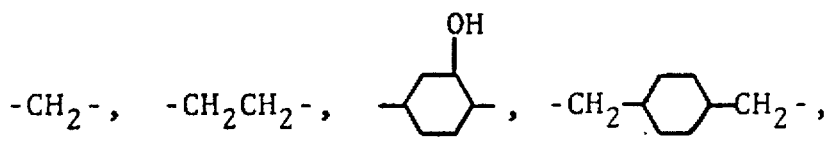

Column 6, line 53, "zenzoic" should read -- benzoic --. Column 7, line 72, "invert" should read -- inert --.

Signed and sealed this 14th day of April 1970.

(SEAL)
Attest:

EDWARD M. FLETCHER, JR.                  WILLIAM E. SCHUYLER, JR.
Attesting Officer                           Commissioner of Patents